United States Patent
Obata et al.

(10) Patent No.: US 11,981,249 B2
(45) Date of Patent: May 14, 2024

(54) HEADLAMP CONTROL METHOD AND HEADLAMP CONTROL DEVICE

(71) Applicants: Nissan Motor Co., Ltd., Kanagawa (JP); RENAULT S.A.S., Boulogne-Billancourt (FR)

(72) Inventors: Masayoshi Obata, Kanagawa (JP); Takashi Ashida, Kanagawa (JP); Maya Fujita, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 617 days.

(21) Appl. No.: 17/268,291

(22) PCT Filed: Aug. 14, 2018

(86) PCT No.: PCT/IB2018/001079
§ 371 (c)(1),
(2) Date: Feb. 12, 2021

(87) PCT Pub. No.: WO2020/035713
PCT Pub. Date: Feb. 20, 2020

(65) Prior Publication Data
US 2021/0331618 A1 Oct. 28, 2021

(51) Int. Cl.
*B60Q 1/14* (2006.01)
*B60W 60/00* (2020.01)

(52) U.S. Cl.
CPC .......... *B60Q 1/143* (2013.01); *B60W 60/005* (2020.02); *B60Q 2300/054* (2013.01); *B60Q 2300/14* (2013.01)

(58) Field of Classification Search
CPC .............. G05D 1/0088; B60Q 1/143; B60Q 2300/054; B60Q 2300/14; B60W 60/005
USPC .......................................................... 701/23
See application file for complete search history.

(56) References Cited

U.S. PATENT DOCUMENTS

| | | | |
|---|---|---|---|
| 2017/0262710 A1 | 9/2017 | Kozuka et al. | |
| 2017/0332010 A1 | 11/2017 | Asakura et al. | |
| 2017/0364629 A1* | 12/2017 | Tarte | G16Z 99/00 |
| 2018/0037154 A1* | 2/2018 | Dudar | B60Q 1/1423 |
| 2018/0201182 A1 | 7/2018 | Zhu | |

(Continued)

FOREIGN PATENT DOCUMENTS

| | | |
|---|---|---|
| JP | 2003-276502 A | 10/2003 |
| JP | 4011374 B2 * | 11/2007 |
| JP | 2011-084237 A | 4/2011 |

(Continued)

*Primary Examiner* — Krishnan Ramesh
(74) *Attorney, Agent, or Firm* — Osha Bergman Watanabe & Burton LLP (57) ABSTRACT

A headlamp control device includes a headlamp control unit for controlling headlamps so as to regulate an irradiation amount, the headlamps being installed in a vehicle equipped with an autonomous driving mode driven in accordance with images acquired by a visible light camera for capturing the circumference of the vehicle and a manual driving mode driven by a driver of the vehicle. The headlamp control unit decreases the irradiation amount of the headlamps in the autonomous driving mode so as to be smaller than the irradiation amount of the headlamps in the manual driving mode.

4 Claims, 10 Drawing Sheets

(56) References Cited

U.S. PATENT DOCUMENTS

2021/0178959 A1\*  6/2021  Ishida ................... F21S 41/675

FOREIGN PATENT DOCUMENTS

| JP | 2012-171499 A | 9/2012 |
| JP | 2017-159882 A | 9/2017 |
| JP | 2017-202768 A | 11/2017 |
| JP | 2018-024351 A | 2/2018 |
| JP | 2018-116705 A | 7/2018 |

\* cited by examiner

HEADLAMP CONTROL METHOD AND HEADLAMP CONTROL DEVICE

TECHNICAL FIELD

The present invention relates to a headlamp control method and a headlamp control device.

BACKGROUND ART

Methods of controlling headlamps are known that improve the accuracy of recognition of targets, such as oncoming vehicles and pedestrians, while avoiding dazzling occupants in the oncoming vehicles or the pedestrians by the glare of light (Patent Document 1).

CITATION LIST

Patent Literature

Patent Document 1: Japanese Unexamined Patent Application Publication No. 2012-171499

SUMMARY OF INVENTION

Technical Problem

The irradiation of light from headlamps is typically set to the amount suitable for drivers. In recent years, research and development have been promoted regarding autonomous driving. If the amount of light emitted from headlamps used in an autonomous driving mode is set to be equivalent to that used in a manual driving mode, unnecessary energy is inevitably consumed. The reason for this is that, since the information around a host vehicle is detected by a visible light camera, and the sensitivity of the visible light camera to light is higher than the sensitivity of human eyes to light, only a small irradiation amount of the headlamps is sufficient for the autonomous driving mode, as compared with the irradiation amount of the headlamps in the manual driving mode. Patent Document 1 does not mention the comparison between the irradiation amount of the headlamps in the autonomous driving mode and that in the manual driving mode. The invention disclosed in Patent Document 1 thus cannot suppress or reduce the energy consumed by the irradiation of light from the headlamps in the autonomous driving mode.

In view of the foregoing problem, the present invention provides a headlamp control method and a headlamp control device contributing to a reduction in energy consumed by irradiation of light from headlamps in an autonomous driving mode.

Technical Solution

A headlamp control method according to an aspect of the present invention decreases the irradiation amount of a headlamp in an autonomous driving mode so as to be smaller than the irradiation amount of the headlamp in a manual driving mode.

Advantageous Effects

The present invention can reduce the energy consumed by the irradiation of light from headlamps in the autonomous driving mode.

DESCRIPTION OF EMBODIMENTS

An embodiment of the present invention will be described below with reference to the drawings. The same elements illustrated in the drawings are indicated by the same reference numerals, and overlapping explanations are not made below.

[Configuration of Headlamp Control System]

Figure 1:
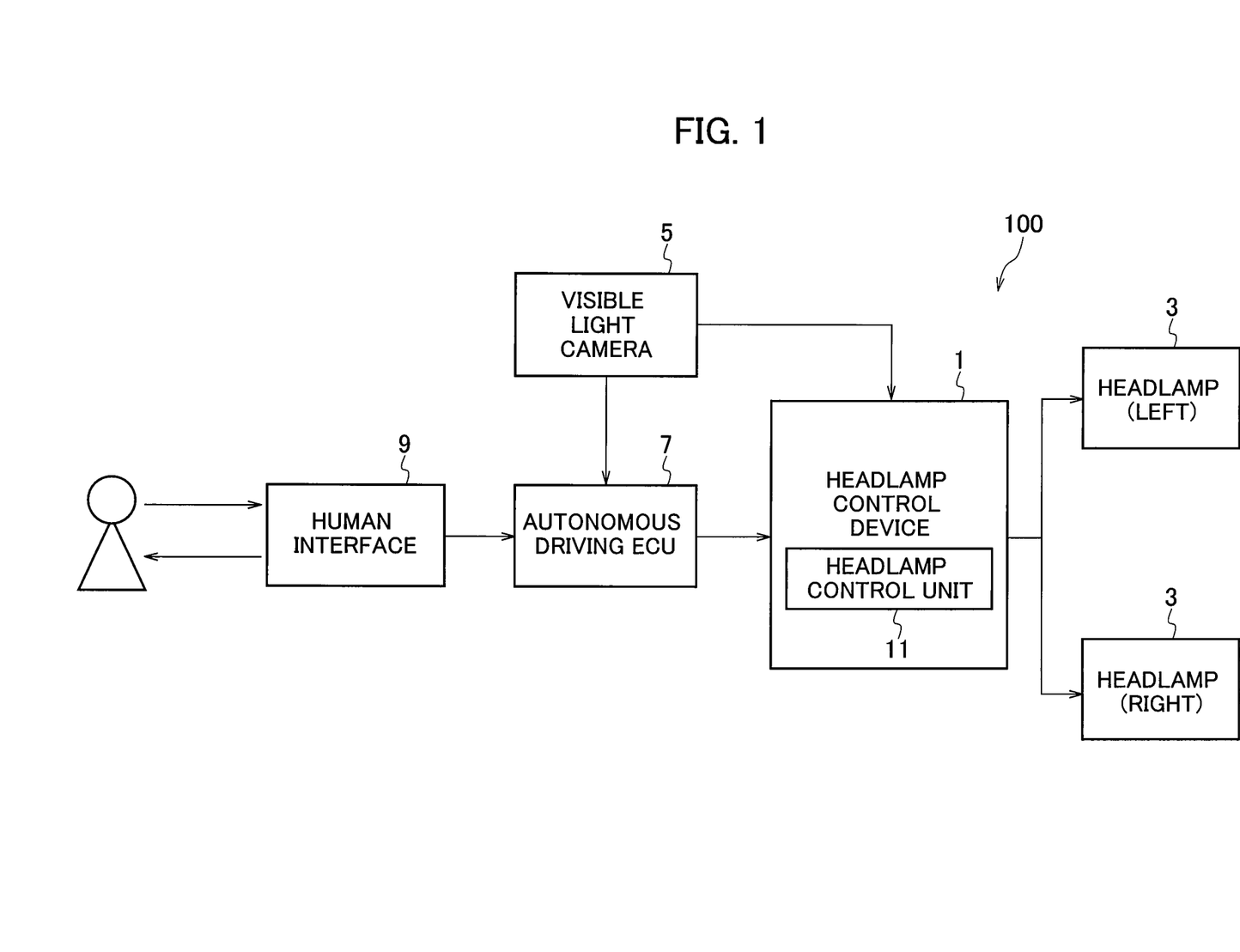
FIG. 1 is a schematic configuration diagram illustrating a headlamp control system according to an embodiment of the present invention.

A configuration of a headlamp control system 100 including a headlamp control device 1 according to the present embodiment is described below with reference to FIG. 1. As illustrated in FIG. 1, the headlamp control system 100 includes the headlamp control device 1, headlamps 3, a visible light camera 5, an autonomous driving ECU 7, and a human interface 9. The headlamp control system 100 is installed in a vehicle enabling autonomous driving.

The headlamps 3 are headlamps, such as intelligent headlamps and adaptive high beams, that can regulate lighting depending on the road condition ahead of the vehicle. In particular, the headlamps 3 are each provided with a plurality of light sources typically using light emitting diodes (LEDs) arranged in a matrix form. Each of the light sources is controlled so as to regulate the lighting. The headlamps 3 are thus configured to control the irradiation amount, in the irradiation range ahead of the vehicle, at the irradiation positions of the respective light sources arranged into the matrix form. For example, when an oncoming vehicle ahead of the vehicle is coming closer to the vehicle, the light sources of the headlamps 3 emitting the light toward the position of the oncoming vehicle are turned off so as to emit the light to the irradiation range with the light, excluding only the position of the oncoming vehicle. The headlamps 3 are typically, but not necessarily, installed at the right and left parts on the front side of the vehicle.

The visible light camera 5 is a camera including an imaging device, such as a charge-coupled device (CCD) or a complementary metal oxide semiconductor (CMOS). The visible light camera 5 is installed in the vehicle so as to capture the condition around the vehicle to output captured images to the autonomous driving ECU 7 and the headlamp control device 1. Since the visible light camera 5 has a high sensitivity to light, the visible light camera 5 can detect obstacles present around the vehicle under the brightness lower than that necessary for the driver to drive manually.

The autonomous driving ECU 7 is an electronic control unit that controls the autonomous driving of the vehicle. The autonomous driving ECU 7 acquires sensor values from a millimeter wave radar, a laser rangefinder, and the like (not illustrated), in addition to the images acquired from the visible light camera 5, and detects obstacles such as pedestrians and other vehicles present around the vehicle. The autonomous driving ECU 7 is connected to a group of sensors (not illustrated). For example, the autonomous driving ECU 7 is connected to an acceleration sensor, a steering sensor, a brake sensor, and a viscosity sensor, so as to further acquire the sensor values output from the sensor group. The autonomous driving ECU 7 also acquires positional information of the vehicle from a GPS receiver mounted on the vehicle, and executes the autonomous driving control while referring to map information stored in a car navigation device. The autonomous driving executed by the autonomous driving ECU 7 is not intervened by the driver, and is in Level 3 or higher. The autonomous driving is executed by the autonomous driving ECU 7 at least in accordance with the images captured by the visible light camera 5 for capturing the circumference of the vehicle. The autonomous driving executed by the autonomous driving ECU 7 may be based on the images acquired by the visible light camera 5 and the data acquired by the sensor group. The following case is illustrated with a mode in which the vehicle is driven in accordance with the images captured by the visible light camera 5 for capturing the circumference of the vehicle, which is referred to also as an "autonomous driving mode", and a mode in which the vehicle is driven by the driver, which is referred to also as a "manual driving mode".

The human interface 9 is an input device that receives the operation by the occupant (including the driver) of the vehicle, and is a display of a touch panel, or a steering switch provided on the steering wheel, for example. The operation of switching between the autonomous driving mode and the manual driving mode is input by the occupant in the vehicle through the human interface 9, or a warning is output from the human interface 9 to notify the occupant in the vehicle.

The headlamp control device 1 is a controller for executing the control of the headlamps 3, for example, controls the lighting of the headlamps 3. In particular, the headlamp control device 1 acquires the images from the visible light camera 5, and acquires the detection information on obstacles and the information necessary for the autonomous driving mode from the autonomous driving ECU 7. The information that the headlamp control device 1 acquires includes the sensor values such as a velocity. The headlamp control device 1 controls the irradiation amount of the headlamps 3 to regulate the lighting depending on the road condition ahead of the vehicle.

The headlamp control device 1 includes a control unit for processing the data acquired from the visible light camera 5 and the autonomous driving ECU 7, and is fabricated by an IC or LSI. The headlamp control device 1 may be an ECU for controlling the headlamps 3. The headlamp control device 1 may be classified as a headlamp control unit 11 when defined as a functional unit.

The headlamp control device 1 may be fabricated by a microcomputer, a microprocessor, a general-purpose electronic circuit including a CPU, and a peripheral device such as a memory. The respective functions of the headlamp control device 1 are implemented in single or plural processing circuits. The respective processing circuits may include a programmed processing device, such as a processing device including an electric circuit. The respective processing circuits may include an application-specific integrated circuit (ASIC) configured to execute the functions described in the present embodiment, or conventional circuit components.

The headlamp control unit 11 determines whether the vehicle is either in the autonomous driving mode or in the manual driving mode driven by the driver of the vehicle, in accordance with the information acquired from the autonomous driving ECU 7. When the vehicle is in the autonomous driving mode, the headlamp control unit 11 controls the headlamps 3 so as to emit light set to the irradiation amount necessary for the autonomous driving mode. When the vehicle is in the manual driving mode, the headlamp control unit 11 may control the headlamps 3 so as to be set to normal low beams or high beams, or may control the headlamps 3 so as to emit light set to the irradiation amount suitable for the manual driving mode. The irradiation amount necessary for the autonomous driving mode may be determined depending on the result of experiments or simulations. The irradiation amount suitable for the manual driving mode may also be determined depending on the result of experiments or simulations. The irradiation amount may vary depending on the type and the size of the vehicle.

[Headlamp Control Processing]

The headlamp control processing executed by the headlamp control device 1 is described below with reference to FIG. 2 and FIG. 3.

Figure 2:
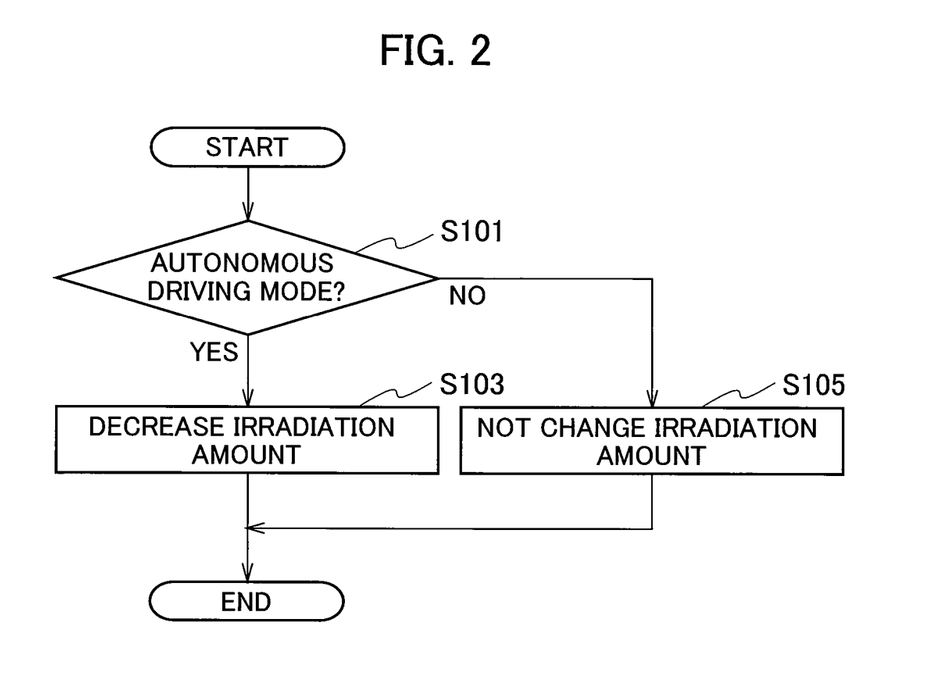
FIG. 2 is a flowchart illustrating an example of operation of a headlamp control device according to the embodiment of the present invention.
Figure 3:
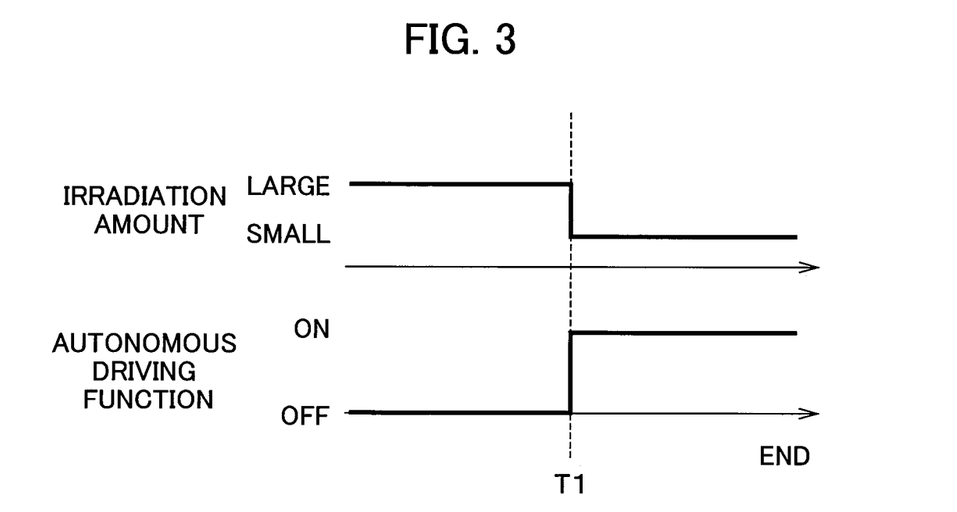
FIG. 3 is a diagram for explaining headlamp control processing in one example performed by the headlamp control device.

In step S101 shown in FIG. 2, the headlamp control unit 11 determines whether the vehicle is in the autonomous driving mode in accordance with the information acquired from the autonomous driving ECU 7. The process proceeds to step S103 when the vehicle is in the autonomous driving mode (Yes in step S101). The process proceeds to step S105 when the vehicle is in the manual driving mode driven by the driver (No in step S101).

In step S103, the headlamp control unit 11 decreases the irradiation amount of the headlamps 3 during the autonomous driving mode so as to be smaller than the irradiation amount in the manual driving mode. This step is described in more detail below with reference to FIG. 3. As illustrated in FIG. 3, the autonomous driving function is OFF before the time T1. The vehicle is thus in the manual driving mode driven by the driver before the time T1. The irradiation amount of the headlamps 3 in the manual driving mode is set to be an appropriate amount as described above. When the occupant operates the human interface 9 so as to switch the autonomous driving function from OFF to ON at the time T1, the vehicle is switched from the manual driving mode to the autonomous driving mode. As illustrated in FIG. 3, when the vehicle is switched from the manual driving mode to the autonomous driving mode at the time T1, the headlamp control unit 11 decreases the irradiation amount of the headlamps 3 so as to be smaller than that in the manual driving mode. As described above, the autonomous driving is executed by the autonomous driving ECU 7 in accordance with the images acquired by the visible light camera 5. Since the sensitivity of the visible light camera 5 to light is higher than the sensitivity of human eyes to light, unnecessary energy would be consumed during the autonomous driving mode if the irradiation amount of the headlamps 3 in the autonomous driving mode is set to be equivalent to that in the manual driving mode. In view of this, the headlamp control unit 11 sets the irradiation amount of the headlamps 3 in the autonomous driving mode to be smaller than that of the headlamps 3 in the manual driving mode. The headlamp control unit 11 thus can save the irradiation amount of the headlamps 3. Namely, the headlamp control unit 11 can suppress or reduce the energy consumed by the irradiation of light from the headlamps 3 in the autonomous driving mode. In step S105, in the manual driving mode, the headlamp control unit 11 does not change the irradiation amount of the headlamps 3.

The headlamp control unit 11 may synchronize the timing of switching the headlamps 3 between the ON state and the OFF state with a frame rate of the visible light camera 5. The specific explanations are made below with reference to FIG. 4 and FIG. 5.

Figure 4:
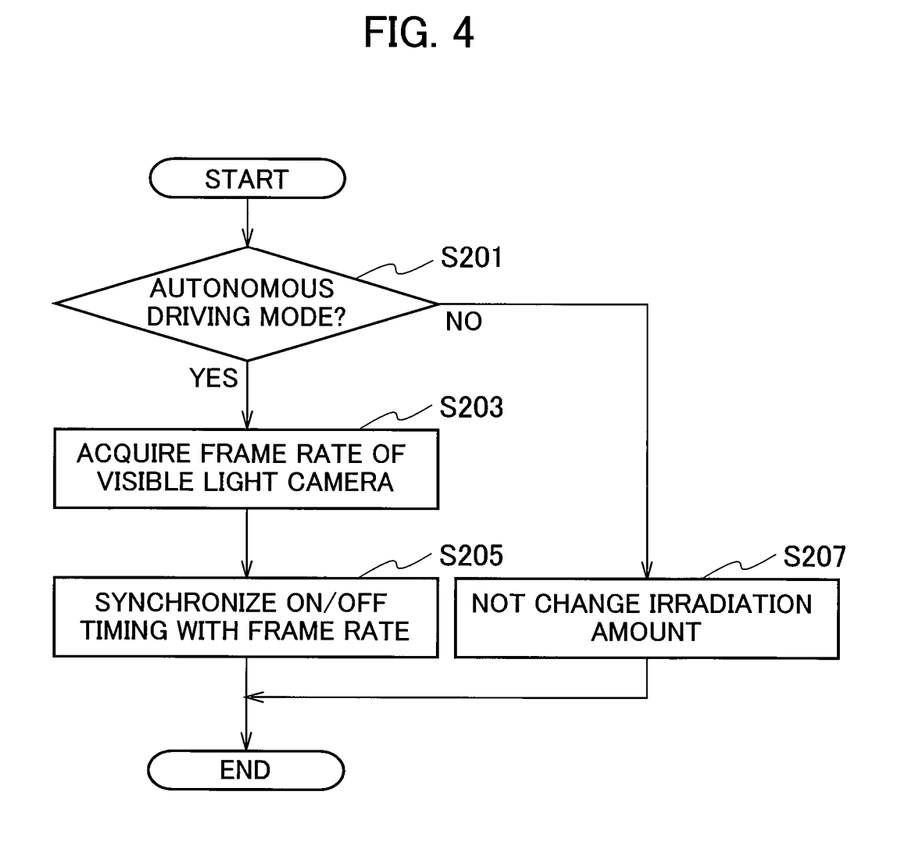
FIG. 4 is a flowchart illustrating an example of operation of the headlamp control device according to the embodiment of the present invention.
Figure 5:
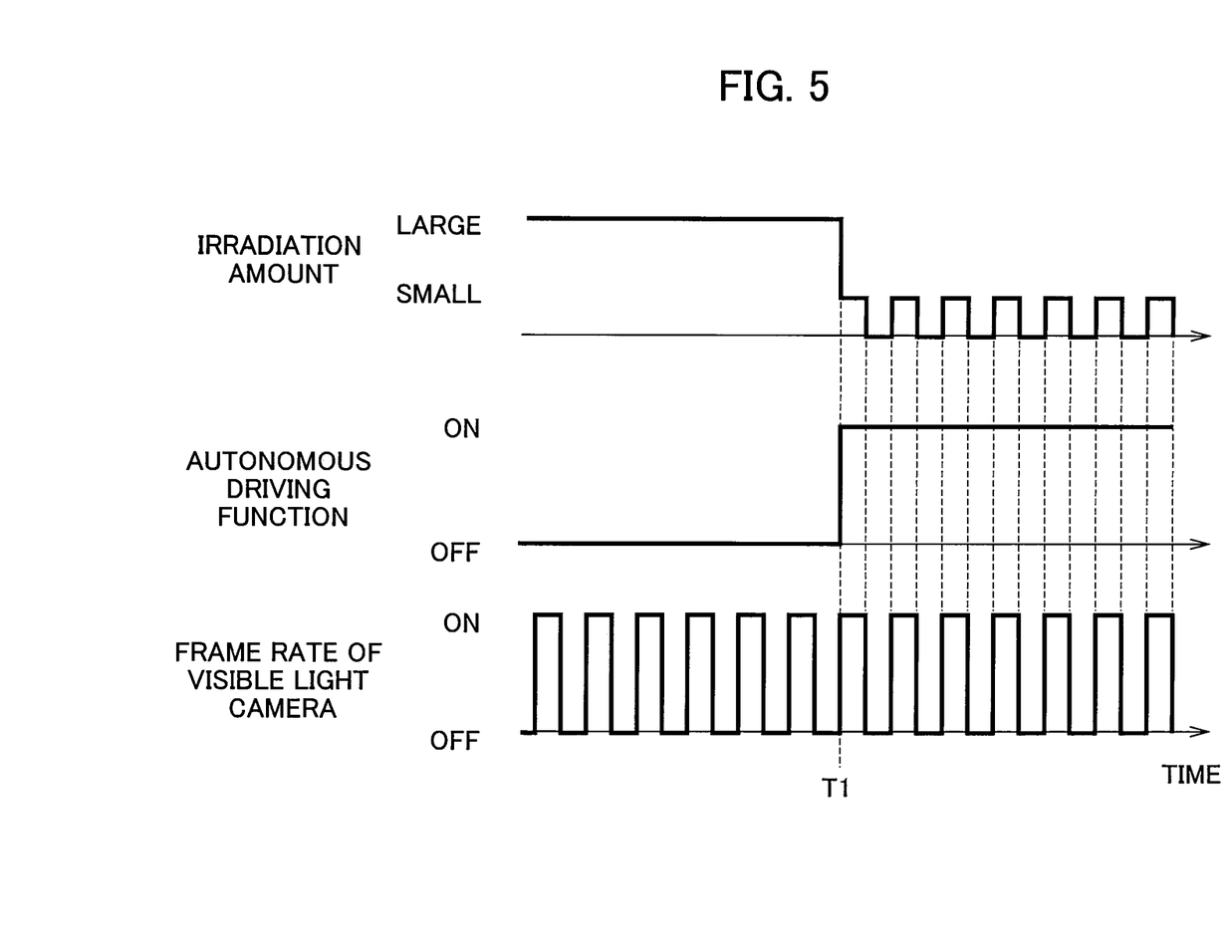
FIG. 5 is a diagram for explaining headlamp control processing in one example performed by the headlamp control device.

The process in step S201 shown in FIG. 4 is the same as in step S101 shown in FIG. 2, and overlapping explanations are not repeated below. In step S203, the headlamp control unit 11 acquires a frame rate of the visible light camera 5. The term "frame rate" as used herein refers to the number of frames processed by the visible light camera 5 per unit time. The frame rate of the visible light camera 5 is determined as appropriate, and is herein set to several tens of Hz. As illustrated in FIG. 5, the visible light camera 5 repeats the operation of turning ON and OFF according to the frame rate preliminarily set. Since the visible light camera 5 senses the light when in the ON state, the headlamps 3 are only required to emit the light when the visible light camera 5 is in the ON state. That is, the headlamps 3 do not necessarily emit the light when the visible light camera 5 is in the OFF state. As illustrated in FIG. 5, the headlamp control unit 11 may synchronize the timing of switching the headlamps 3 between the ON state and the OFF state with the frame rate of the visible light camera 5 (in step S205 shown in FIG. 4). The headlamp control unit 11 thus can further reduce the energy consumed by the irradiation of light from the headlamps 3. The timing of switching the headlamps 3 between the ON state and the OFF state can be referred to as the timing of switching the headlamps 3 between the lighting-up state and turned-off state. The process in step S207 shown in FIG. 4 is the same as in step S105 shown in FIG. 2, and overlapping explanations are not repeated below.

The headlamp control unit 11 may also decreases the irradiation amount of the headlamps 3 depending on the condition around the vehicle. The specific explanations are made below with reference to FIG. 6.

Figure 6:
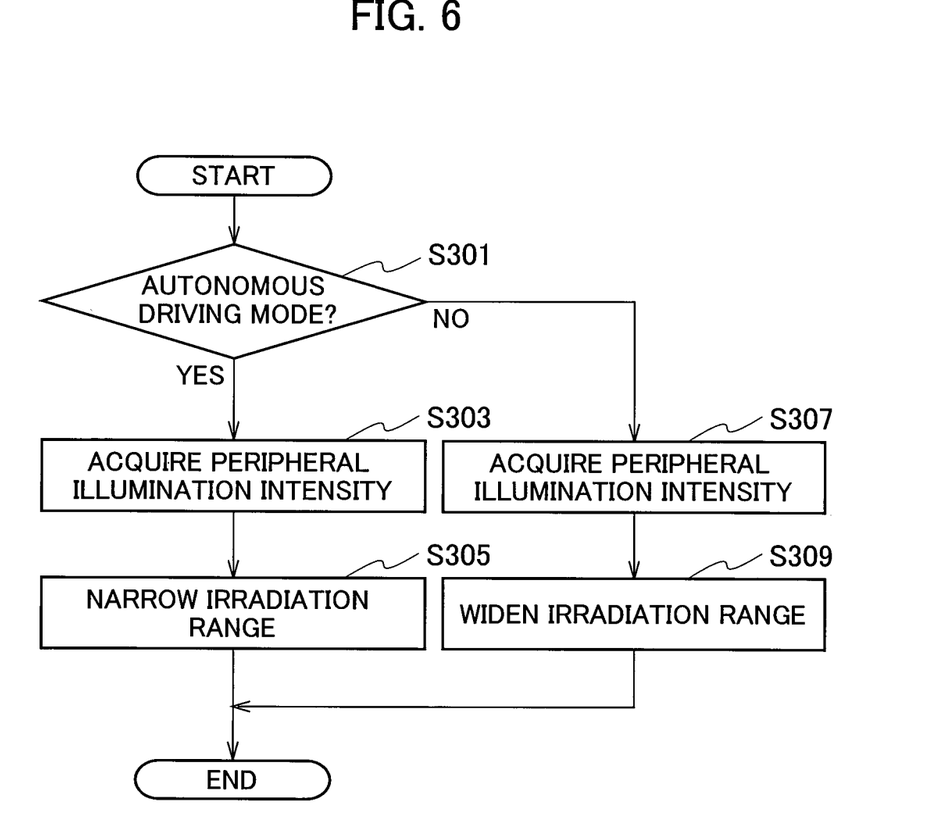
FIG. 6 is a flowchart illustrating an example of operation of the headlamp control device according to the embodiment of the present invention.

The process in step S301 shown in FIG. 6 is the same as in step S101 shown in FIG. 2, and overlapping explanations are not repeated below. In step S303, the headlamp control unit 11 acquires an intensity of illumination around the vehicle according to the information acquired by the visible light camera 5 or an illumination sensor (not illustrated) installed in the vehicle. The intensity of illumination around the vehicle is greater as the number of street lights around the vehicle is greater. The intensity of illumination around the vehicle also increases as the number of other vehicles around the vehicle increases. When the intensity of illumination around the vehicle is high, the autonomous driving ECU 7 can use the light around the vehicle so as to detect obstacles. The headlamp control unit 11 thus may further decrease the irradiation amount in the autonomous driving mode when the intensity of illumination around the vehicle is high, as compared with the case in which the intensity of illumination is low. The headlamp control unit 11 can further reduce the energy consumed by the irradiation of light from the headlamps 3 accordingly.

As shown in step S305, the headlamp control unit 11 may narrow the irradiation range of the headlamps 3 when the intensity of illumination around the vehicle is high, as compared with the case in which the intensity of illumination is low. For example, when a street light lights up a road sign above the vehicle, the headlamps 3 do not necessarily light up the sign. The headlamp control unit 11, when narrowing the irradiation range of the headlamps 3, thus can further reduce the energy consumed by the irradiation of light from the headlamps 3.

In step S307, in the manual driving mode, the headlamp control unit 11 may control the headlamps 3 depending on the intensity of illumination around the vehicle. The intensity of illumination around the vehicle includes the characteristics of a road sign (such as color and reflectance). In step S309, the headlamp control unit 3 may widen the irradiation range of the headlamps 3 in accordance with the characteristics of the road sign (such as color and reflectance). The headlamp control unit 11, when widening the irradiation range of the headlamps 3, may increase the irradiation amount of the headlamps 3. The headlamp control unit 11 thus can provide the irradiation range and the irradiation amount suitable for the driver.

The headlamp control unit 11 may regulate the irradiation amount of the headlamps 3 depending on the presence or absence of a fault in the autonomous driving mode. The specific explanations are made below with reference to FIG. 7 to FIG. 10.

Figure 7:
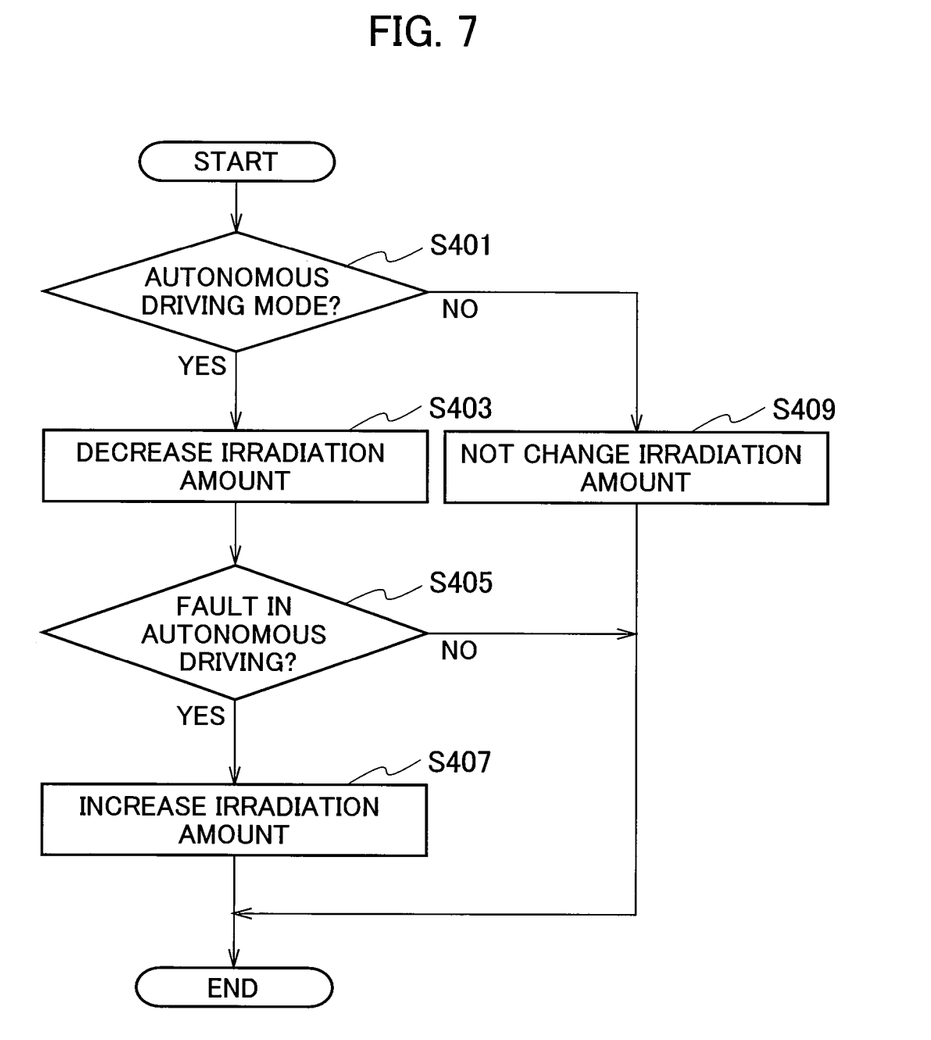
FIG. 7 is a flowchart illustrating an example of operation of the headlamp control device according to the embodiment of the present invention.
Figure 8:
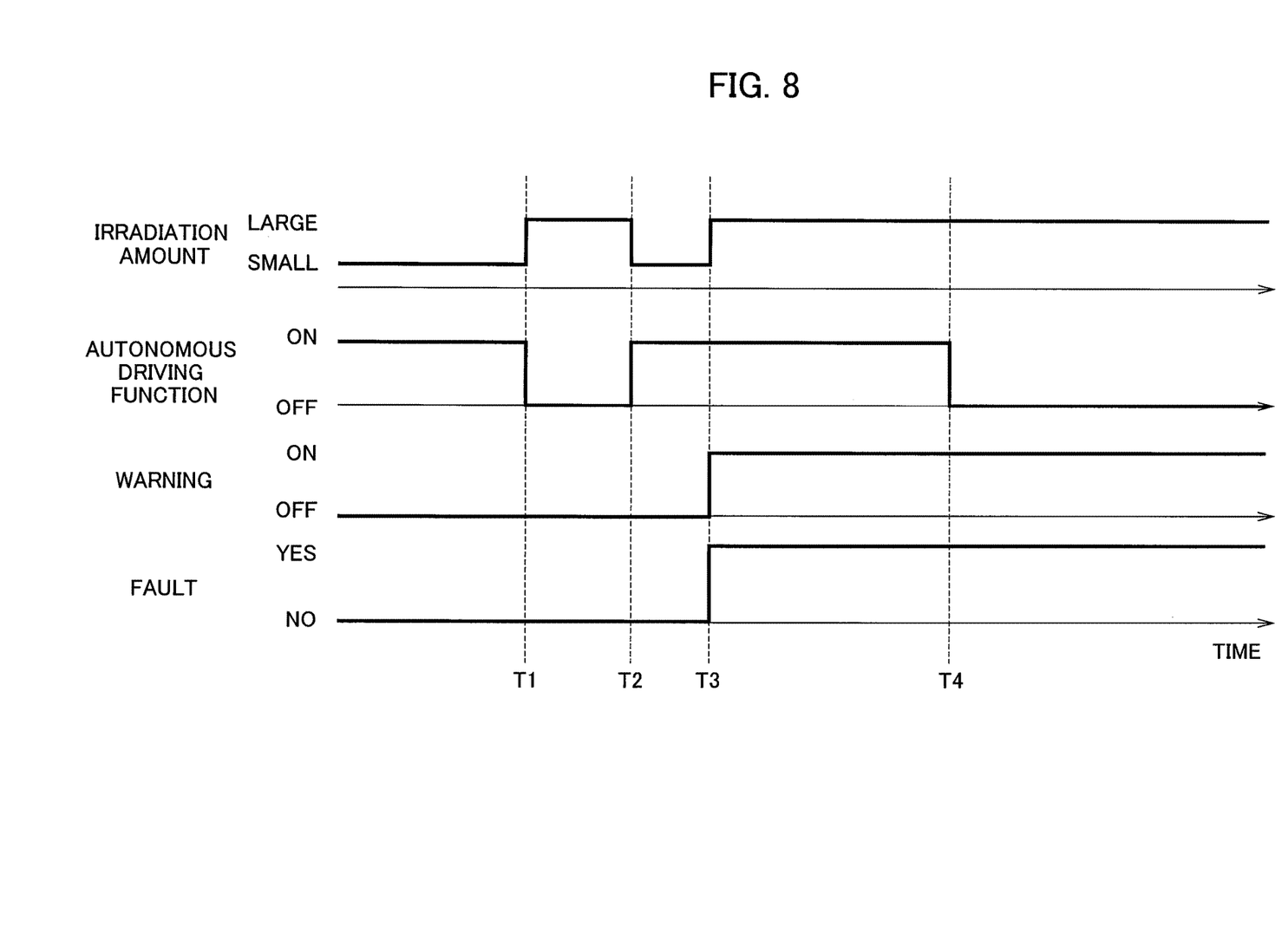
FIG. 8 is a diagram for explaining headlamp control processing in one example performed by the headlamp control device.

The process in steps S401, S403, and S409 shown in FIG. 7 is the same as in steps S101, S103, and S105 shown in FIG. 2, and overlapping explanations are not repeated below. In step S405, the headlamp control unit 11 detects the presence or absence of a fault in the autonomous driving mode. The phrase "the presence of a fault in the autonomous driving mode" refers to a state in which the autonomous driving mode is not being executed normally. When a fault in the autonomous driving mode is detected (Yes in step S405), the process proceeds to step S407, and the autonomous driving mode is switched to the manual driving mode. The switching operation may be informed with voice saying "An error has been detected in the autonomous driving. Please switch to the manual driving", for example. This information is presented in view of the time necessary for the switching operation. When the headlamp control unit 11 detects a fault in the autonomous driving mode at the time T3 shown in FIG. 8, a warning (switch) is informed, and the headlamp control unit 11 then increases the irradiation amount during the period until the operation of switching from the autonomous driving mode to the manual driving mode is completed (during the period from the time T3 to the time T4) so as to be greater than the irradiation amount during the autonomous driving mode (during the period from the time T2 to the time T3). FIG. 8 illustrates the case in which the headlamp control unit 11 sets the irradiation amount to be the same as the irradiation amount in the manual driving mode until the operation of switching from the autonomous driving mode to the manual driving mode is completed. The driver thus can accurately recognize the condition around the vehicle during the period until the operation of switching from the autonomous driving mode to the manual driving mode is completed. The example of operation at the time T1 and the time T2 shown in FIG. 8 is the same as that shown in FIG. 3, and overlapping explanations are not repeated below. A warning indicating "Please have the vehicle served at the dealer", for example, may be displayed on the display until the fault in the autonomous driving mode is cleared away after the time T4.

Figure 9:
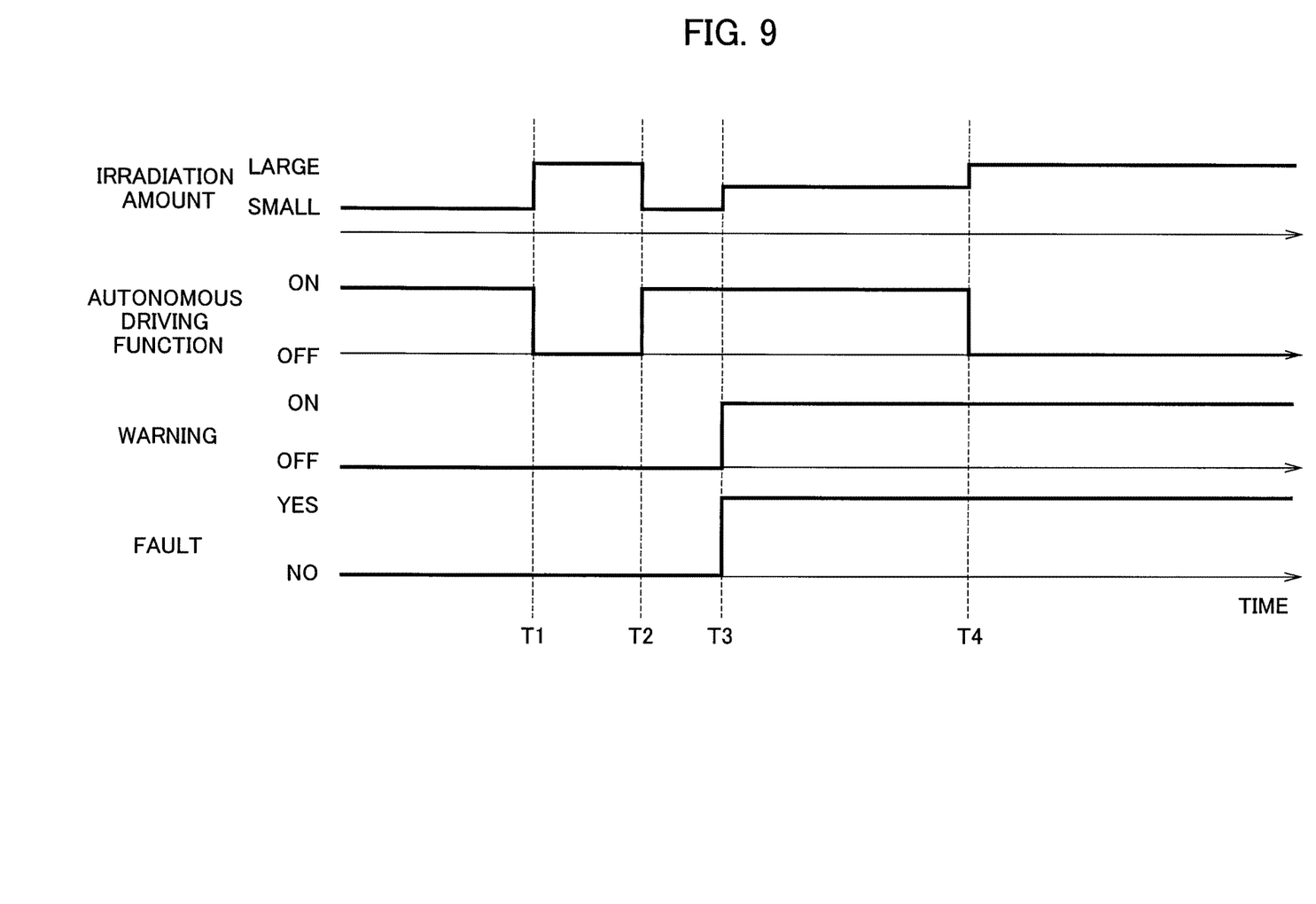
FIG. 9 is a diagram for explaining headlamp control processing in one example performed by the headlamp control device.

While FIG. 8 illustrates the case in which the headlamp control unit 11 sets the irradiation amount to be the same as the irradiation amount in the manual driving mode until the operation of switching from the autonomous driving mode to the manual driving mode is completed, the present embodiment is not limited to this case. For example, as shown in FIG. 9, the headlamp control unit 11 is only required to set the irradiation amount to be greater than that in the autonomous driving mode until the operation of switching from the autonomous driving mode to the manual driving mode is completed. The headlamp control unit 11 then only needs to set the irradiation amount at the time when the operation of switching from the autonomous driving mode to the manual driving mode is completed (at the time T4) to be the same as the irradiation amount in the manual driving mode. If the irradiation amount of the headlamps 3 is increased rapidly during the switching operation, the driver may be dazzled by the glare of light. In view of this, increasing the irradiation amount while taking the two steps as shown in FIG. 9 can reduce the driver's discomfort.

Figure 10:
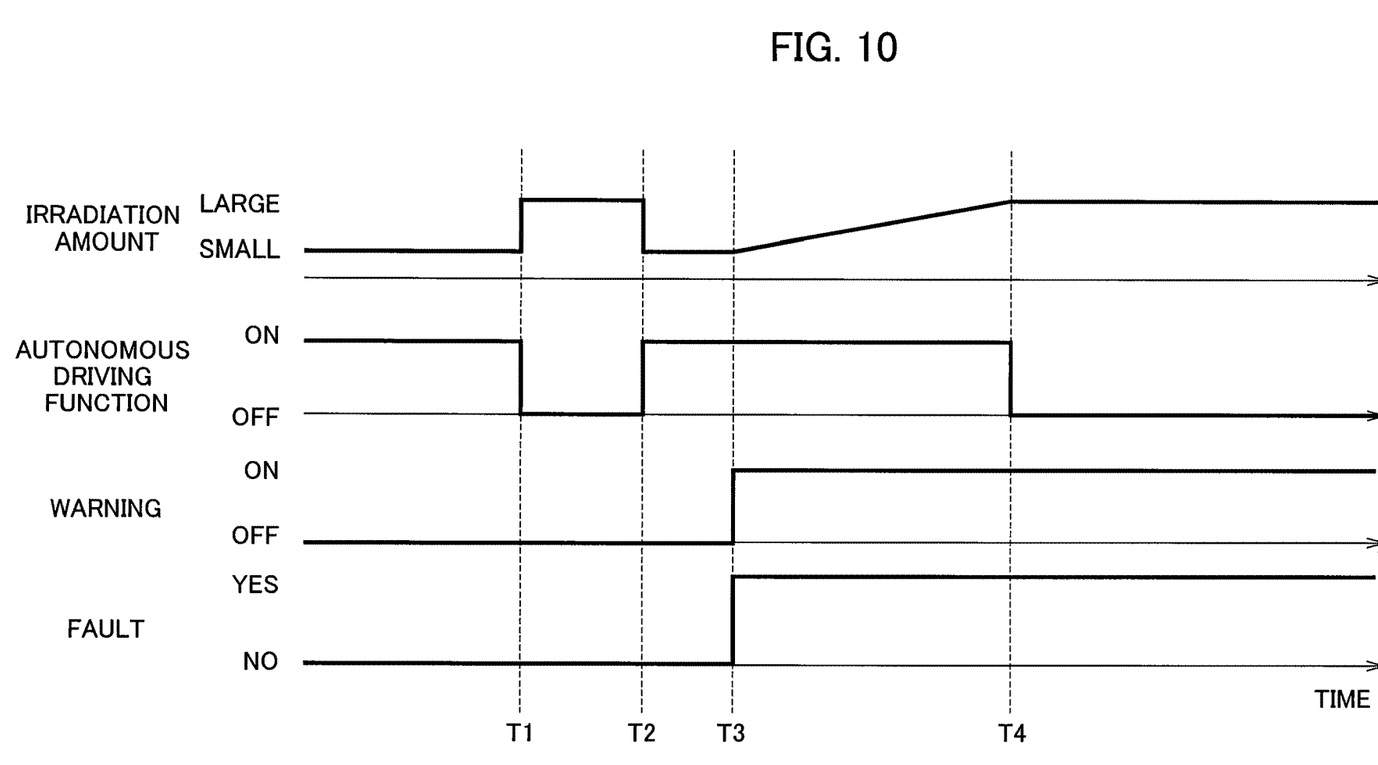
FIG. 10 is a diagram for explaining headlamp control processing in one example performed by the headlamp control device.

Alternatively, as shown in FIG. 10, the headlamp control unit 11 may gradually increase the irradiation amount during the period until the operation of switching from the autonomous driving mode to the manual driving mode is completed. The headlamp control unit 11 then only needs to set the irradiation amount at the time when the operation of switching from the autonomous driving mode to the manual driving mode is completed (at the time T4) to be the same as the irradiation amount in the manual driving mode, as in the case shown in FIG. 9.

The headlamp control unit 11 may also regulate the irradiation amount of the headlamps 3 depending on the determination of whether a preceding vehicle is a large-sized vehicle. The specific explanations are made below with reference to FIG. 11.

Figure 11:
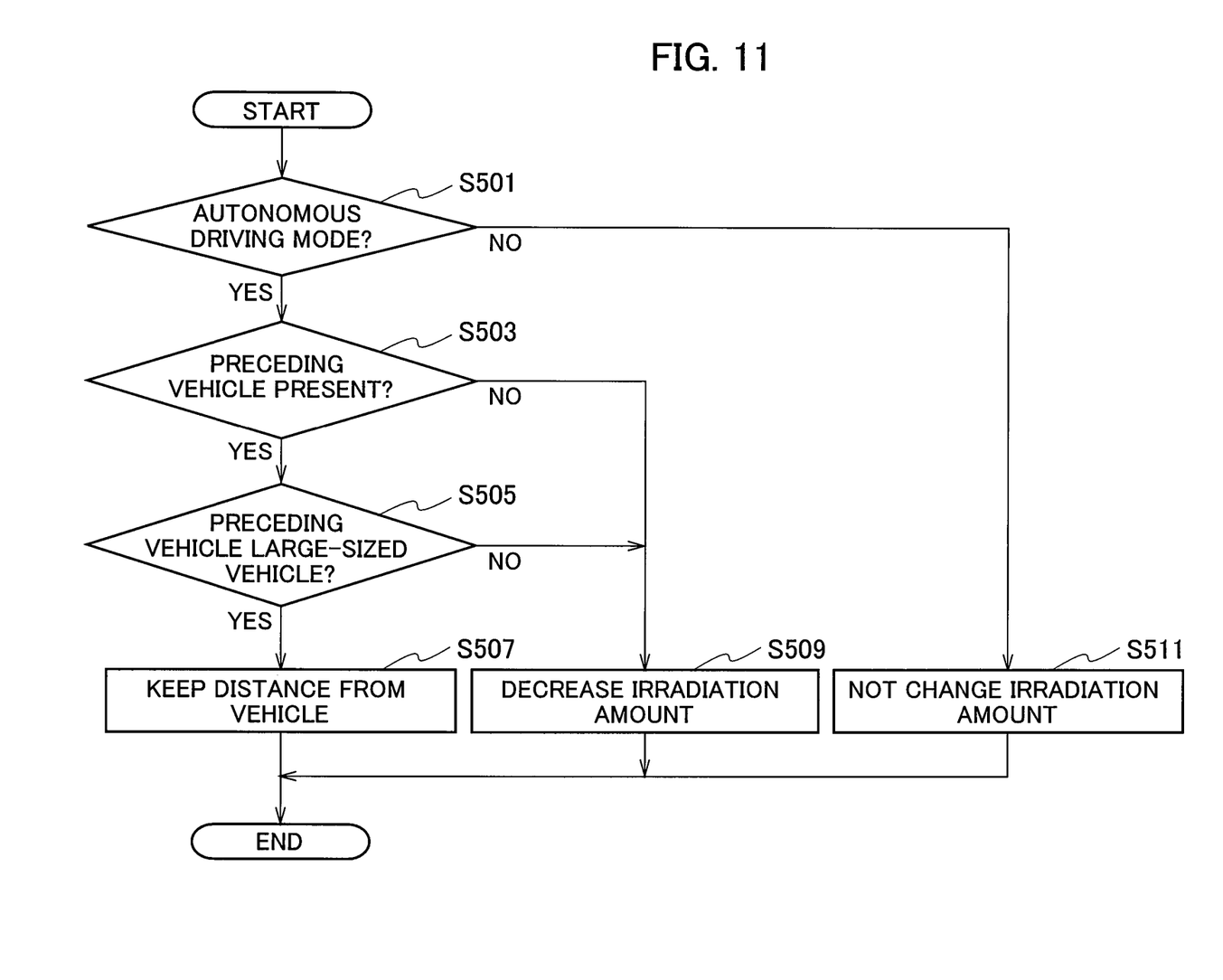
FIG. 11 is a flowchart illustrating an example of operation of the headlamp control device according to the embodiment of the present invention.

The process in steps S501, S509, and S511 shown in FIG. 11 is the same as in steps S101, S103, and S105 shown in FIG. 2, and overlapping explanations are not repeated below. In step S503, the headlamp control unit 11 determines whether a preceding vehicle traveling in front of the vehicle is present according to the information acquired from the visible light camera 5 or the sensor group. The process proceeds to step S505 when the preceding vehicle is present (Yes in step S503). When there is no preceding vehicle (No in step S503), the process proceeds to step S509. In step S505, the headlamp control unit 11 determines whether the preceding vehicle is a large-sized vehicle (such as a truck). The process proceeds to step S509 when the preceding vehicle is not a large-sized vehicle (No in step S505), and the headlamp control unit 11 then decreases the irradiation amount of the headlamps 3. The determination that the preceding vehicle is not a large-sized vehicle indicates that the preceding vehicle is a standard-sized vehicle. The reason for the operation of decreasing the irradiation amount of the headlamps 3 by the headlamp control unit 11 is to avoid dazzling the driver in the preceding vehicle by the glare of light. The process proceeds to step S507 when the preceding vehicle is a large-sized vehicle (Yes in step S505), and the autonomous driving ECU 7 causes the vehicle to keep the distance from the preceding vehicle.

The headlamp control device 1 according to the present embodiment described above can achieve the following effects.

The vehicle according to the present embodiment is equipped with the autonomous driving mode driven in accordance with the images acquired by the visible light camera 5 for capturing the circumference of the vehicle, and the manual driving mode driven by the driver of the vehicle. Since the sensitivity of the visible light camera 5 to light is higher than the sensitivity of human eyes to light, unnecessary energy would be consumed during the autonomous driving mode if the irradiation amount of the headlamps 3 in the autonomous driving mode is set to be equivalent to that in the manual driving mode. In view of this, the headlamp control unit 11 sets the irradiation amount of the headlamps 3 in the autonomous driving mode to be smaller than that in the manual driving mode. The headlamp control unit 11 thus can save the irradiation amount of the headlamps 3. Namely, the headlamp control unit 11 can suppress or reduce the energy consumed by the irradiation of light from the headlamps 3 in the autonomous driving mode.

The headlamp control unit 11 may detect the presence or absence of a fault in the autonomous driving mode. When a fault in the autonomous driving mode is detected, the headlamp control unit 11 may set the irradiation amount to be greater than that in the autonomous driving mode until the operation of switching from the autonomous driving mode to the manual driving mode is completed. If the irradiation amount of the headlamps 3 is increased rapidly during the switching operation, the driver may be dazzled by the glare of light. Regulating the irradiation amount thus can reduce the driver's discomfort. In addition, the driver can accurately recognize the condition around the vehicle when the operation of switching from the autonomous driving mode to the manual driving mode is completed.

The headlamp control unit 11 may synchronize the timing of switching the headlamps 3 between the ON state and the OFF state with the frame rate of the visible light camera 5. The visible light camera 5 repeats the operation of turning ON and OFF according to the frame rate preliminarily set. Since the visible light camera 5 senses the light when in the ON state, the headlamps 3 are only required to emit light when the visible light camera 5 is in the ON state. The headlamp control unit 11 thus can further reduce the energy consumed by the irradiation of light from the headlamps 3.

The headlamp control unit 11 may decrease the irradiation amount of the headlamps 3 when the intensity of illumination around the vehicle is high, as compared with the case in which the intensity of illumination is low. Since the autonomous driving ECU 7 can use the light around the vehicle to detect obstacles when the intensity of illumination around the vehicle is high, the headlamp control unit 11 can further reduce the energy consumed by the irradiation of light from the headlamps 3.

The respective functions described in the above embodiment can be implemented in single or plural processing circuits. The respective processing circuits include a programmed processing device, such as a processing device including an electric circuit. The respective processing circuits include an application-specific integrated circuit (ASIC) configured to execute the functions described above, and devices such as circuit components. The headlamp control device 1 can improve the functions of a computer.

While the present invention has been described above by reference to the embodiment, it should be understood that the present invention is not intended to be limited to the descriptions and the drawings composing part of this disclosure. Various alternative embodiments, examples, and technical applications will be apparent to those skilled in the art according to this disclosure.

The irradiation range necessary for the autonomous driving mode described above may be set to a range allowing the headlamp control device to detect obstacles present in a region requiring a safety check when executing the autonomous driving mode. For example, the irradiation range necessary for the autonomous driving mode may be set to be wider than the irradiation range of the low beams, and may be set to be the same as the irradiation range of the high beams. The reason for this is that pedestrians or other obstacles may be insufficiently irradiated with the light upon the use of the low beams since the irradiation range of the low beams is set to the lower side, which may impede the accurate detection of the obstacles required when executing the autonomous driving mode.

REFERENCE SIGNS LIST

1 HEADLAMP CONTROL DEVICE
3 HEADLAMP
5 VISIBLE LIGHT CAMERA
7 AUTONOMOUS DRIVING ECU
9 HUMAN INTERFACE
11 HEADLAMP CONTROL UNIT
100 HEADLAMP CONTROL SYSTEM

The invention claimed is:

1. A headlamp control method of controlling a headlamp so as to regulate an irradiation amount, the headlamp being installed in a vehicle equipped with an autonomous driving mode driven in accordance with an image acquired by a visible light camera for capturing a circumference of the vehicle and a manual driving mode driven by a driver of the vehicle, the method comprising:

decreasing the irradiation amount of the headlamp in the autonomous driving mode so as to be smaller than the irradiation amount of the headlamp in the manual driving mode; and when a fault in the autonomous driving mode is detected, setting the irradiation amount to be equal to the irradiation amount in the manual driving mode until an operation of switching from the autonomous driving mode to the manual driving mode is completed.

2. The headlamp control method according to claim 1, wherein an operation of switching the headlamp between ON and OFF is synchronized with a frame rate of the visible light camera.

3. The headlamp control method according to claim 1, wherein the irradiation amount in the autonomous driving mode is decreased when an intensity of illumination around the vehicle is high as compared with a case in which the intensity of illumination is low.

4. A headlamp control device comprising a control unit for controlling a headlamp so as to regulate an irradiation amount, the headlamp being installed in a vehicle equipped with an autonomous driving mode driven in accordance with an image acquired by a visible light camera for capturing a circumference of the vehicle and a manual driving mode driven by a driver of the vehicle, the control unit being configured to:
    decrease the irradiation amount of the headlamp in the autonomous driving mode so as to be smaller than the irradiation amount of the headlamp in the manual driving mode; and
    when a fault in the autonomous driving mode is detected, set the irradiation amount to be equal to the irradiation amount in the manual driving mode until an operation of switching from the autonomous driving mode to the manual driving mode is completed.

* * * * *